Jan. 12, 1932.  A. W. WOODWARD  1,841,075

RIM LOCK

Filed May 10, 1928

Inventor
Alva W. Woodward.
By
Attorney

Patented Jan. 12, 1932

1,841,075

UNITED STATES PATENT OFFICE

ALVA W. WOODWARD, OF AKRON, OHIO, ASSIGNOR TO THE GOODYEAR TIRE & RUBBER COMPANY, OF AKRON, OHIO, A CORPORATION OF OHIO

RIM LOCK

Application filed May 10, 1928. Serial No. 276,574.

This invention relates to demountable rims for wheels, and it has particular relation to rims of the above designated character comprising transversely split members which employ latching devices for maintaining the ends of the members in circumferential alignment.

An object of the invention is to provide an improved releasable latching device for a rim of the type referred to, which is adapted to coact with the ends of the transversely split member, in order to maintain them in abutting and aligned relation.

Transversely split members embodied in annular rims usually employ latching devices for maintaining the ends of the members in aligned relation in order to provide smooth bases for pneumatic tires to rest upon. It is desirable that the latching devices be of simple construction, easily operated, and that they be maintained rigidly in operative position.

This embodiment of the invention comprises an element slidably secured to one end of a split annular member, which is adapted to engage the other end thereof. An inflated inner tube, positioned upon the member, tends to maintain the element in its operative position. However, upon releasing the pressure in the tube, the element is easily movable to its inoperative position, wherein the ends of the split member may be moved relatively.

For a better understanding of the invention, reference may now be had to the accompanying drawings, forming a part of the specification, of which;

Figure 1:
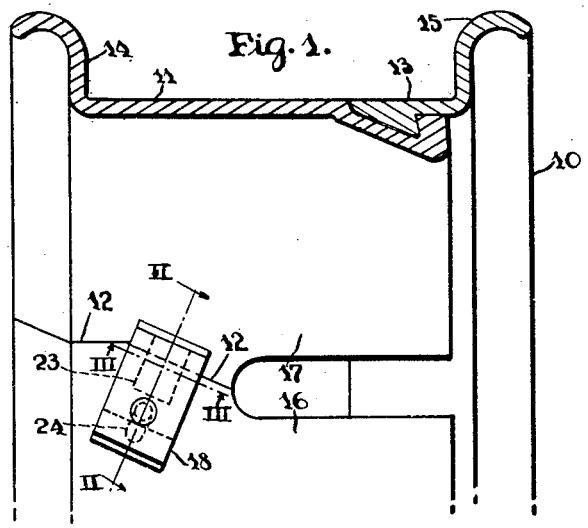
Figure 1 is a fragmentary view of a rim embodying a latching device constructed according to the invention.
Figure 3:
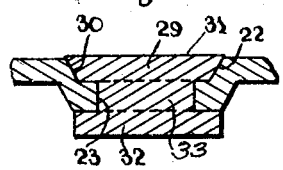
Figure 3 is a cross-sectional view, on a larger scale, taken substantially along the line III—III of Figure 1.

Referring to Figure 1, a rim 10 comprises a base member 11 which is transversely split, as indicated at 12, and interlocked with an endless member 13. At their outer edges the members are provided with tire engaging flanges 14 and 15, respectively. Ends 16 and 17 of the member 11 are maintained in aligned relation by a latching device 18, operatively associated therewith.

Figure 2:
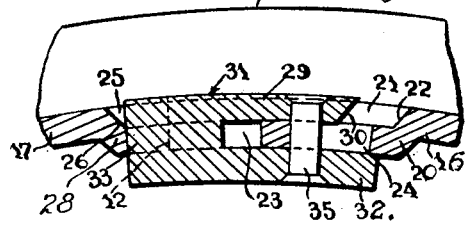
Figure 2 is a cross-sectional view, on a larger scale, taken substantially along the line II—II of Figure 1.

As best shown by Figure 2, the end 16 of the member 11 is offset, as indicated at 20, to provide a rectangular depression 21 having tapered sides 22. Intermediately of these sides, the portion 20 is provided with a substantially rectangular slot 23, which extends from a point near the longitudinal center of the depression to the end of the rim bordering the split 12. The depressed portion 20 also is provided with an elongate slot 24 which is spaced circumferentially of the rim with respect to the slot 23. An offset portion 28, formed in the end 17 of the member 11, defines a depression 25 disposed oppositely with respect to the depression 21 and having tapered sides 26. This depression, while of lesser length than the depression 21, is equal thereto in width. An aperture 27, embodying a continuation of the slot 23, is formed in the offset portion 28.

The latching device 18 includes an outer plate 29, disposed in the depression 21, and having tapering edges 30 which are complementary to the edges 22. The thickness of the plate 29 is slightly greater than the depth of the depression and, consequently, its outer surface 31 projects slightly beyond the outer peripheral surface of the member 11. The latching device also includes an inner plate 32, which is disposed on the inner surface of the member 11, and secured to the plate 29 at one end by an integral portion 33. This portion is equal to the slot 23 in length and width.

Figure 4:
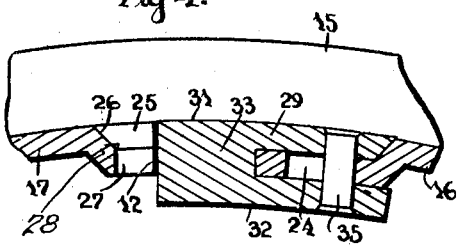
Figure 4 is a cross-sectional view of the latching device shown by Figure 2, illustrating its inoperative position.

When the latching device is assembled within the member 11, the plate 29 is disposed in the depression 21, while the rectangular portion 33 is disposed in the slot 23. The free ends of the plates 29 and 32 then are connected together by a rivet 35, which projects through the oblong slot 24. As best shown by Figure 4, the latching device in this position does not project beyond the split toward the end 17 of the member 11, and consequently the ends of the member are relatively movable. However, when the latching device is moved into its operative position, as shown by Figure 2, the portion 33 engages the slot 27, and the plates 29 and 32 engage the opposite surfaces of the member 11 adjacent the end 17 thereof, in which the depression 25 is formed. Consequently, in this position both radial and transverse movement of the ends of the member positively is prevented.

The latching device normally is maintained in its operative position by an inflated inner tube disposed upon the outer surface of the rim 11, and thus engaging the projecting surface of the plate 29. When it becomes necessary to disassemble the rim, the tube is deflated, and the pressure against the latching device consequently is removed.

Figure 6:
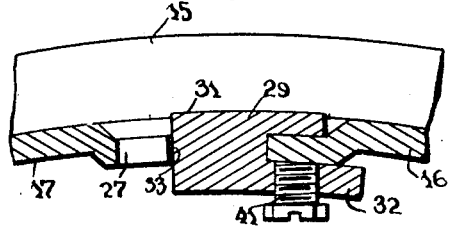
Figure 6 is a cross-sectional view of the device shown by Figure 5, illustrating its inoperative position.
Figure 5:
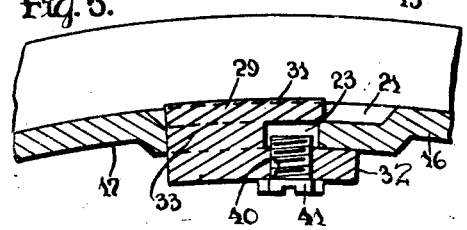
Figure 5 is a cross-sectional view of a latching device constructed according to another form of the invention.

In the embodiment of the invention shown by Figures 5 and 6, the rivet 35 and slot 24 are dispensed with. Also, the depression 21 and plates 29 and 32 are somewhat shorter in length. In addition, the plate 32 is provided with a screw-threaded opening 40 having a screw 41 disposed therein. When the latching device is in its operative position, the screw is projected into the slot 23 and positively prevents its movement to inoperative position. When it is desired to move the device to its inoperative position, the screw is withdrawn from the slot. Preferably, the projecting surface 31 is retained in this construction, although it may be dispensed with.

From the foregoing description, it is apparent that a latching device embodying the invention prevents both relative radial and lateral movements of the ends of the transversely split member comprising an element of the rim structure. Moreover, the pressure of the inner tube upon the outer plate 29 tends to maintain the latching device in its operative position. However, upon deflation of the inner tube, this pressure is removed, and the latching device may be moved easily to its inoperative position. Also, it will be apparent that the device is simple and inexpensive in construction, since essentially it involves only a single integral element.

Although I have illustrated only one form which the invention may assume, and have described in detail only a single application thereof, it will be apparent to those skilled in the art that the invention is not so limited but that various minor modifications may be made therein without departing from the spirit of the invention or from the scope of the appended claims.

What I claim is:

1. In combination with a substantially annular rim having a split therein, a latching device comprising an element slidably secured to one end of the rim and having portions adapted to engage both the inner and outer peripheral surfaces of the other end of the rim.

2. In combination with a substantially annular rim having a split therein, a latching device comprising an element slidably mounted in a depressed portion of one end of the rim, and having portions adapted to engage both the inner and outer peripheries of the other end of the rim.

3. In combination with a substantially annular rim having a split therein, registering slots in the ends of the rim adjoining the split, a latching device slidably secured to one end of the rim and having a portion operable in the slots, said device also having portions adapted to engage both the inner and outer peripheries of the other end of the rim.

4. The combination with a substantially annular member having a split therein, one end of the member having a slot, of a latching device for engaging both ends of the member, said device having a portion slidable in the slot and a screw adapted to be projected into the slot at one side of said portion.

5. The combination with a substantially annular member having a split therein and registering depressed portions in its ends adjoining the split, said depressed portions having registering slots, of a pair of plates engaging the inner and outer sides of the depressed portions, and having a portion slidable in the slots, and a screw passing through one of the plates and adapted to project into one of the slots.

6. The combination with a substantially annular pneumatic tire supporting rim having a transversely split base member, said base member having registering depressed portions in its ends adjoining the split, one of said depressed portions having a slot therein, of a pair of plates engaging the inner and outer sides of the depressed portions of the base member and a member connecting the plates and slidable in the slot.

7. The combination with a substantially annular pneumatic tire supporting rim having a transversely split base member, said base member having registering depressed portions in its ends adjoining the split, one of said depressed portions having a slot therein, of a pair of plates engaging the inner and outer sides of the depressed portions of the base member and a member connecting the plates and slidable in the slot, the outer plate having a depth greater than that of the depression in the rim.

8. The combination with a substantially annular rim having a split therein, of a latching device comprising an element slidably secured to one end of the rim and having portions slidably engaging both the inner and outer peripheral surfaces of both ends of the rim.

9. The combination with a substantially annular rim having a transversely extending split therein, of a latching device comprising an element having slidable engagement with the inner and outer peripheral surfaces of both ends of the rim.

10. The combination with a substantially annular pneumatic tire supporting rim having a transversely extending split therein, the ends of the rim having registering depressed portions in their outer surfaces, the depressed portions having registering slots therein, of a latching device comprising a pair of plates engaging the inner and outer surfaces of the depressed portions and slidable relative thereto, and a member interconnecting the plates and slidable in the slots.

In witness whereof, I have hereunto signed my name.

Signed at Akron, in the County of Summit, and State of Ohio, this 9th day of May, 1928.

ALVA W. WOODWARD.